United States Patent
Hattori et al.

(10) Patent No.: US 8,162,627 B2
(45) Date of Patent: Apr. 24, 2012

(54) INTEGRATED-INVERTER ELECTRIC COMPRESSOR

(75) Inventors: Makoto Hattori, Aichi (JP); Takayuki Takashige, Aichi (JP); Kazuki Niwa, Aichi (JP); Takashi Nakagami, Aichi (JP); Koji Nakano, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 525 days.

(21) Appl. No.: 12/443,285

(22) PCT Filed: Sep. 5, 2008

(86) PCT No.: PCT/JP2008/066043
§ 371 (c)(1),
(2), (4) Date: Mar. 27, 2009

(87) PCT Pub. No.: WO2009/031638
PCT Pub. Date: Mar. 12, 2009

(65) Prior Publication Data
US 2010/0074770 A1    Mar. 25, 2010

(30) Foreign Application Priority Data
Sep. 6, 2007   (JP) ................................. 2007-231590

(51) Int. Cl.
*F04B 17/00*  (2006.01)
*H02K 11/00*  (2006.01)
(52) U.S. Cl. ...................................... 417/410.1; 310/71
(58) Field of Classification Search ................. 417/44.1, 417/237, 352–354, 410.1; 310/71
See application file for complete search history.

(56) References Cited

U.S. PATENT DOCUMENTS

| 2008/0078084 A1* | 4/2008 | Sekii et al. ................. 29/898.02 |
| 2008/0095646 A1* | 4/2008 | Nishii et al. ................... 417/411 |
| 2009/0260858 A1* | 10/2009 | Nakai et al. .................... 174/252 |

FOREIGN PATENT DOCUMENTS

| JP | 2002-164485 A | 6/2002 |
| JP | 2005-57875 A | 3/2005 |
| JP | 2005-167013 A | 6/2005 |
| JP | 2006-2755 A | 1/2006 |
| JP | 2006-66465 A | 3/2006 |
| JP | 3760877 B2 | 3/2006 |

OTHER PUBLICATIONS

International Search Report of PCT/JP2008/066043, date of mailing date Dec. 9, 2008.

* cited by examiner

*Primary Examiner* — Bumsuk Won
(74) *Attorney, Agent, or Firm* — Westerman, Hattori, Daniels & Adrian, LLP

(57) ABSTRACT

An integrated-inverter electric compressor is provided, in which a change of the combination of weld plating layers provided on weld surfaces of an electrical connection terminal of an inverter can be allowed for easily. In an integrated-inverter electric compressor in which an inverter is integrally fitted to a compressor housing and an electrical connection terminal that electrically connects the inverter to an electric motor and/or an external power source is provided, one end of the electrical connection terminal has a wire-bonding weld surface for the inverter, the wire-bonding weld surface being provided with a weld plating layer for welding a bonding wire thereto, whereas the other end of the electrical connection terminal has weld surfaces for the electric motor and/or the external power source, the weld surfaces of two sides being respectively provided with different weld plating layers for connecting lead wires, bus bars, or terminals thereto.

5 Claims, 4 Drawing Sheets

US 8,162,627 B2

INTEGRATED-INVERTER ELECTRIC COMPRESSOR

TECHNICAL FIELD

The present invention relates to an integrated-inverter electric compressor suitable for use as a refrigerant compressor used in a vehicle air conditioner, and particularly, to an electrical connection terminal used in an inverter of the integrated-inverter electric compressor.

BACKGROUND ART

Regarding refrigerant compressors used in vehicle air conditioners, with the emergence of vehicles like hybrid vehicles, electric vehicles, or fuel-cell vehicles in recent years, open compressors that use the engine as a driving source are being replaced by electric compressors containing an electric motor that partially uses power supplied from the battery as a driving source. With regard to such an electric compressor, an integrated-inverter electric compressor in which an inverter is integrally fitted to a compressor housing that contains a compression mechanism and an electric motor is becoming widely used. In such an integrated-inverter electric compressor, the inverter integrally fitted to the compressor housing is electrically connected to the electric motor contained in the compressor housing and to an external power source, such as a battery, via electrical connection terminals.

Patent Document 1 discloses a type in which an inverter is formed by providing a plastic-insert-molded bus-bar integrated plate, power-supply terminals protruding from this bus-bar integrated plate are connected to direct-current power cables, and three-phase alternating-current terminals protruding horizontally from the bus-bar integrated plate are connected to electric-motor terminals. Patent Document 2 discloses a type in which a printed wiring board constituting an inverter and a metallic pin terminal, which is a terminal to be connected to an electric motor via a fast-on terminal, are electrically connected to each other by soldering.

Patent Document 1:
The Publication of Japanese Patent No. 3760877
Patent Document 2:
Japanese Unexamined Patent Application, Publication No. 2006-2755

DISCLOSURE OF INVENTION

Because the aforementioned inverter is to be fitted to a vehicle electric compressor, there are demands for simplification of the fitting process and size reduction, and therefore, modularization of components that constitute a power-system circuit unit, such as power switching devices, is being implemented. The electrical connection terminals and the inverter are connected to each other by welding in view of stress caused by vibration therebetween, and the electrical connection terminals and the electric motor and/or the power source are also connected to each other by welding in view of stress caused by vibration therebetween. In this case, in addition to the selection of the material used for a terminal body constituting each electrical connection terminal, the selection of materials used for weld plating layers provided on weld surfaces at opposite ends of the terminal body is a significant factor that affects the weld quality. In other words, a poor combination of weld plating materials provided on the weld surfaces at the opposite ends of the terminal body can cause weld failure or weld spatter.

On the other hand, whereas one end of each electrical connection terminal is connected to the inverter, the other end is connected to the electric motor and/or the power source, which means that the welding methods and the welding conditions are different. Specifically, the welding to the inverter is implemented by means of relatively narrow bonding wires, whereas the welding to the electric motor and/or the power source is implemented by means of relatively thick lead wires, bus bars, or terminals; therefore, the conditions must sometimes be changed in accordance with the welding methods. In this case, although the weld plating layers to be provided on the weld surfaces at the opposite ends of the terminal body are preferably the same, a mismatch can occur in the combination depending on the welding methods and the welding conditions, thus creating a need to change the combination of weld plating layers.

However, preparing multiple terminals with a different combination of weld plating layers is by no means desirable since it complicates the production control, can cause assembly errors, and increases the cost of manufacturing. In Patent Document 2 described above, although the terminal body of each electrical connection terminal is composed of a metallic material having low thermal conductivity, such as stainless steel, iron, or an iron alloy, and the surface of the terminal body is plated with a metallic material having high thermal conductivity, such as copper, gold, or silver, so as to allow for easier soldering, this is intended for reducing the amount of heat required for welding and for preventing the peripheral components from being overheated, but there is no suggestion about allowing for a change of the combination of weld plating layers.

In view of the circumstances described above, an object of the present invention is to provide an integrated-inverter electric compressor in which a change of the combination of weld plating layers provided on the weld surfaces of each electrical connection terminal of the inverter can be allowed for easily.

In order to achieve the aforementioned object, an integrated-inverter electric compressor according to the present invention employs the following solutions.

Specifically, in an integrated-inverter electric compressor according to the present invention in which an inverter is integrally fitted to a compressor housing containing a compression mechanism and an electric motor, and the inverter is provided with an electrical connection terminal that electrically connects the inverter to the electric motor and/or an external power source, one end of the electrical connection terminal has a wire-bonding weld surface for the inverter, the wire-bonding weld surface being provided with a weld plating layer for welding a bonding wire thereto, whereas the other end of the electrical connection terminal has weld surfaces for the electric motor and/or the external power source, the weld surfaces of two sides being respectively provided with different weld plating layers for connecting lead wires, bus bars, or terminals thereto.

In the integrated-inverter electric compressor for a vehicle, the electrical connection terminal is provided for electrically connecting the inverter to the electric motor and/or the external power source. The electrical connection terminal and the inverter are connected to each other by welding in view of stress caused by vibration therebetween, and the electrical connection terminal and the electric motor and/or the external power source are also connected to each other by welding in view of stress caused by vibration therebetween; however, there are cases where the combination of weld plating layers provided on the weld surfaces of the terminal may need to be changed depending on, for example, the welding conditions.

According to the present invention, the wire-bonding weld surface at one end, to be connected to the inverter, of the electrical connection terminal is provided with a weld plating layer suitable for welding a bonding wire thereto, whereas the two weld surfaces, for the electric motor and/or the external power source, at the other end are respectively provided with weld plating layers suitable for welding lead wires, bus bars, or terminals thereto. Therefore, even when there is a need to change the combination of weld plating layers due to the electrical connection terminal's relationship with objects to be welded thereto, in terms of welding conditions, it is easy to allow for the change of the combination of weld plating layers by using one of the different weld plating layers respectively provided on the two weld surfaces. Consequently, the adaptability to a change in the welding conditions is improved, thereby preventing the occurrence of weld failure or weld spatter caused by a poor combination of weld plating layers.

The integrated-inverter electric compressor according to the present invention may be configured such that, in the aforementioned integrated-inverter electric compressor, the weld plating layer provided on the wire-bonding weld surface and the weld plating layer provided on one of the two weld surfaces are the same weld plating layer, the weld plating layer being provided over substantially the entire electrical connection terminal.

According to this configuration, because the weld plating layers provided on the wire-bonding weld surface at one end of the electrical connection terminal and on one of the two weld surfaces at the other end are the same weld plating layer, and the weld plating layer is provided over substantially the entire electrical connection terminal, after immersing the electrical connection terminal in a plating solution, the other weld surface at the other end is given a different weld plating layer, whereby the electrical connection terminal provided with a weld plating layer on the wire-bonding weld surface at one end and provided with different weld plating layers respectively on the two weld surfaces at the other end can be fabricated readily using a small number of steps.

The integrated-inverter electric compressor according to the present invention may be configured such that, in the electrical connection terminal in one of the aforementioned integrated-inverter electric compressors, a terminal body is composed of brass, the weld plating layer provided on the wire-bonding weld surface is a tin plating layer, the weld plating layer provided on one of the two weld surfaces is a tin plating layer, and the weld plating layer provided on the other one of the two weld surfaces is a nickel plating layer.

According to this configuration, the terminal body of the electrical connection terminal is composed of brass, the weld plating layer provided on the wire-bonding weld surface at one end is a tin plating layer, and the weld plating layers provided respectively on the two weld surfaces at the other end are a tin plating layer and a nickel plating layer, respectively, thereby allowing for the use of readily-available materials for all of the materials and also allowing for the use of a combination of materials that are both highly electrically conductive and thermally conductive. Consequently, satisfactory welding properties can be ensured for the electrical connection terminal, and moreover, the electrical connection terminal can be fabricated at low cost.

The integrated-inverter electric compressor according to the present invention may be configured such that, in any one of the aforementioned integrated-inverter electric compressors, the electrical connection terminal is integrated, by plastic insert molding, in a plastic casing, which is modularized, of the inverter.

According to this configuration, since the electrical connection terminal is integrated in the modularized plastic casing of the inverter by plastic insert molding, the electrical connection terminal can be securely fixed to the inverter. Consequently, when welding the bonding wire and the lead wires, bus bars, or terminals to the opposite ends of the electrical connection terminal, these components can be properly positioned so that they can be welded with high accuracy.

According to the present invention, even when there is a need to change the combination of weld plating layers due to the electrical connection terminal's relationship with objects to be welded to the opposite ends thereof, in terms of welding conditions, it is easy to allow for a change of the combination of weld plating layers by using one of the different weld plating layers respectively provided on the two weld surfaces. Consequently, the adaptability to a change in the welding conditions is improved, thereby preventing the occurrence of weld failure or weld spatter caused by a poor combination of weld plating layers.

EXPLANATION OF REFERENCE SIGNS

Figure 1:
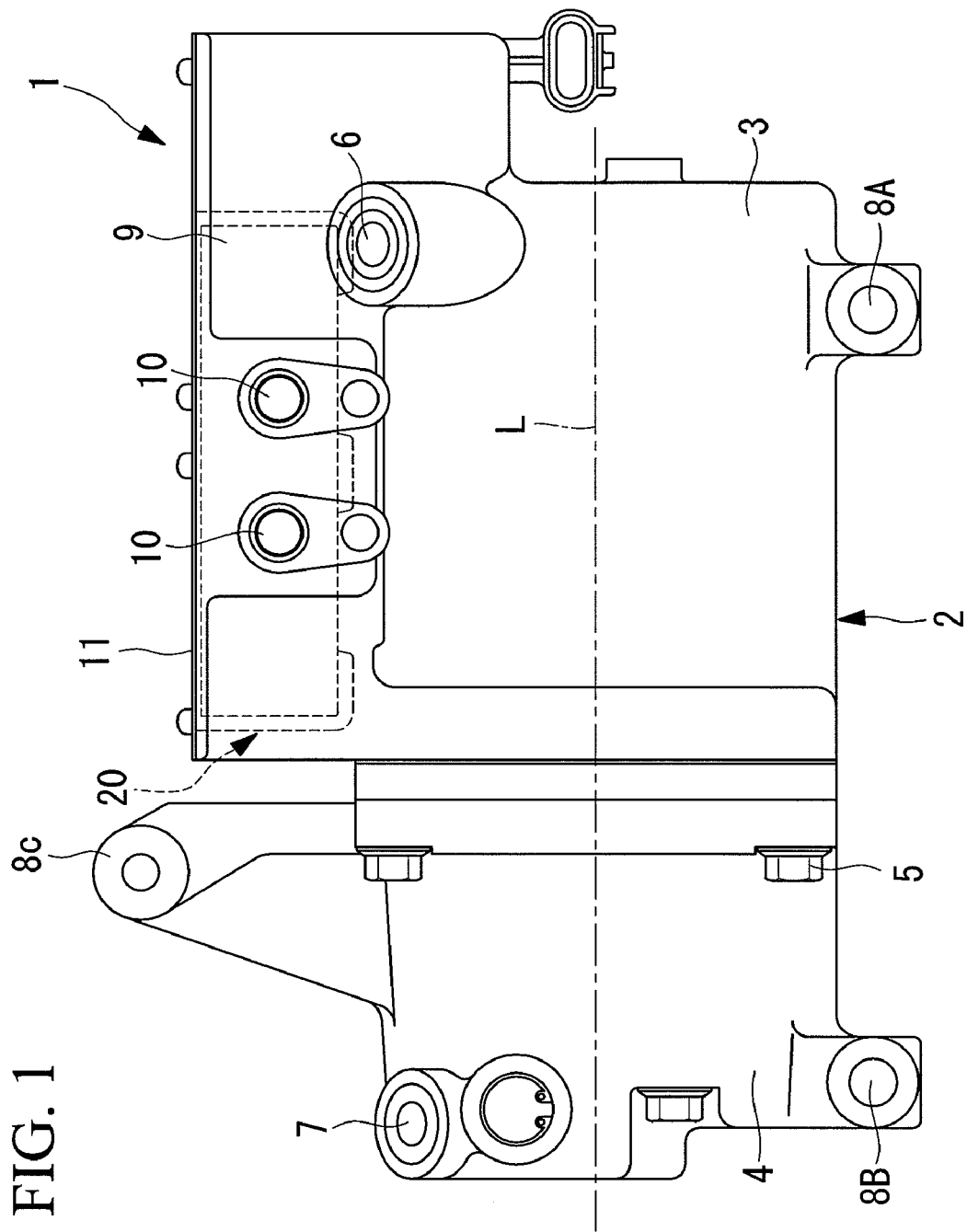
FIG. 1 is an external side view of an integrated-inverter electric compressor according to an embodiment of the present invention.
Figure 2A:
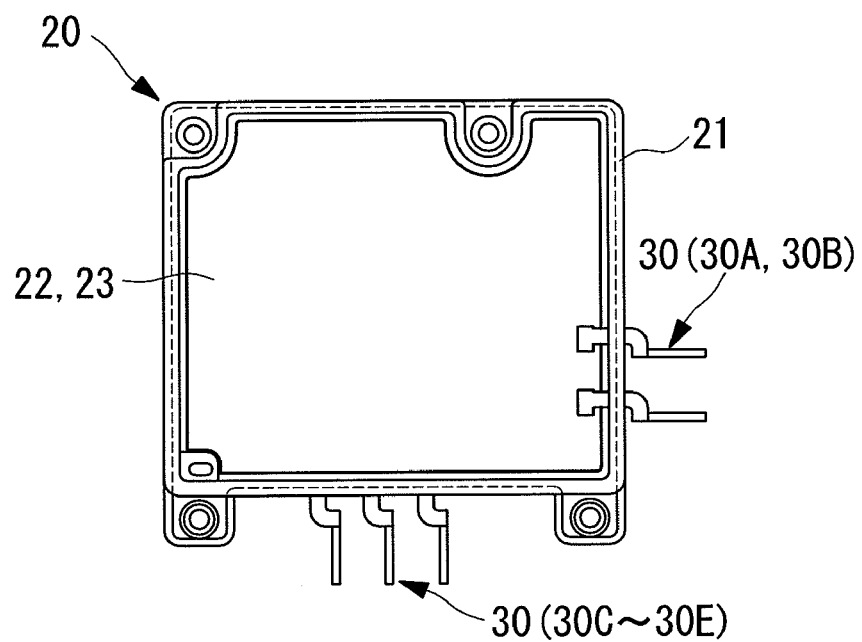
FIG. 2A is a plan view showing the schematic configuration of an inverter fitted to the integrated-inverter electric compressor shown in FIG. 1.
Figure 2B:
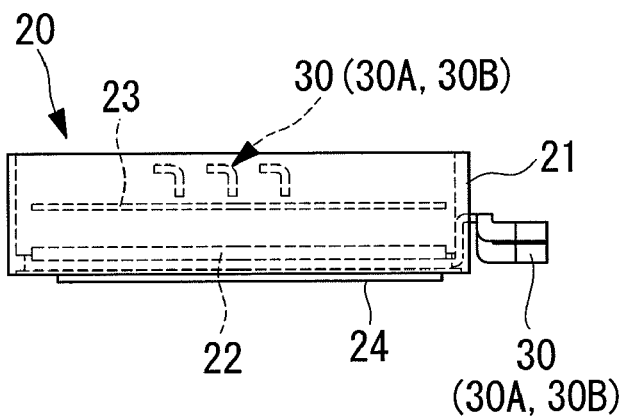
FIG. 2B is a side view showing the schematic configuration of the inverter shown in FIG. 2A.
Figure 2C:
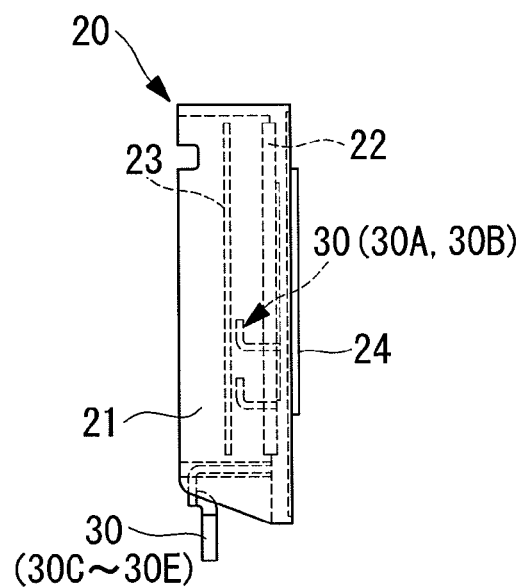
FIG. 2C is a left side view showing the schematic configuration of the inverter shown in FIG. 2A.
Figure 2D:
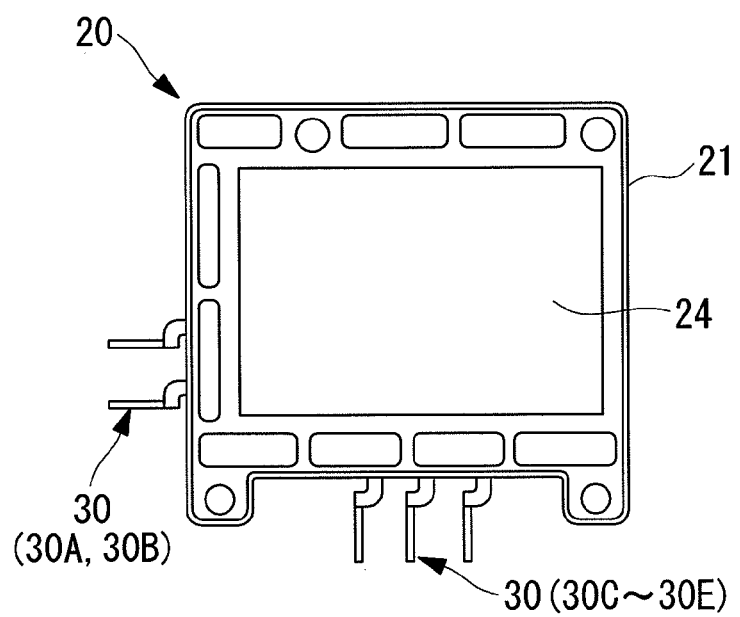
FIG. 2D is a bottom view showing the schematic configuration of the inverter shown in FIG. 2A.

1: integrated-inverter electric compressor
2: compressor housing
20: inverter
21: plastic casing
30: electrical-connection terminal
30A, 30B: power-supply terminal
30C, 30D, 30E: alternating-current terminal
31: bonding wire
32: wire-bonding weld surface
33, 34: weld surface
35: terminal body

BEST MODE FOR CARRYING OUT THE INVENTION

Figure 3:
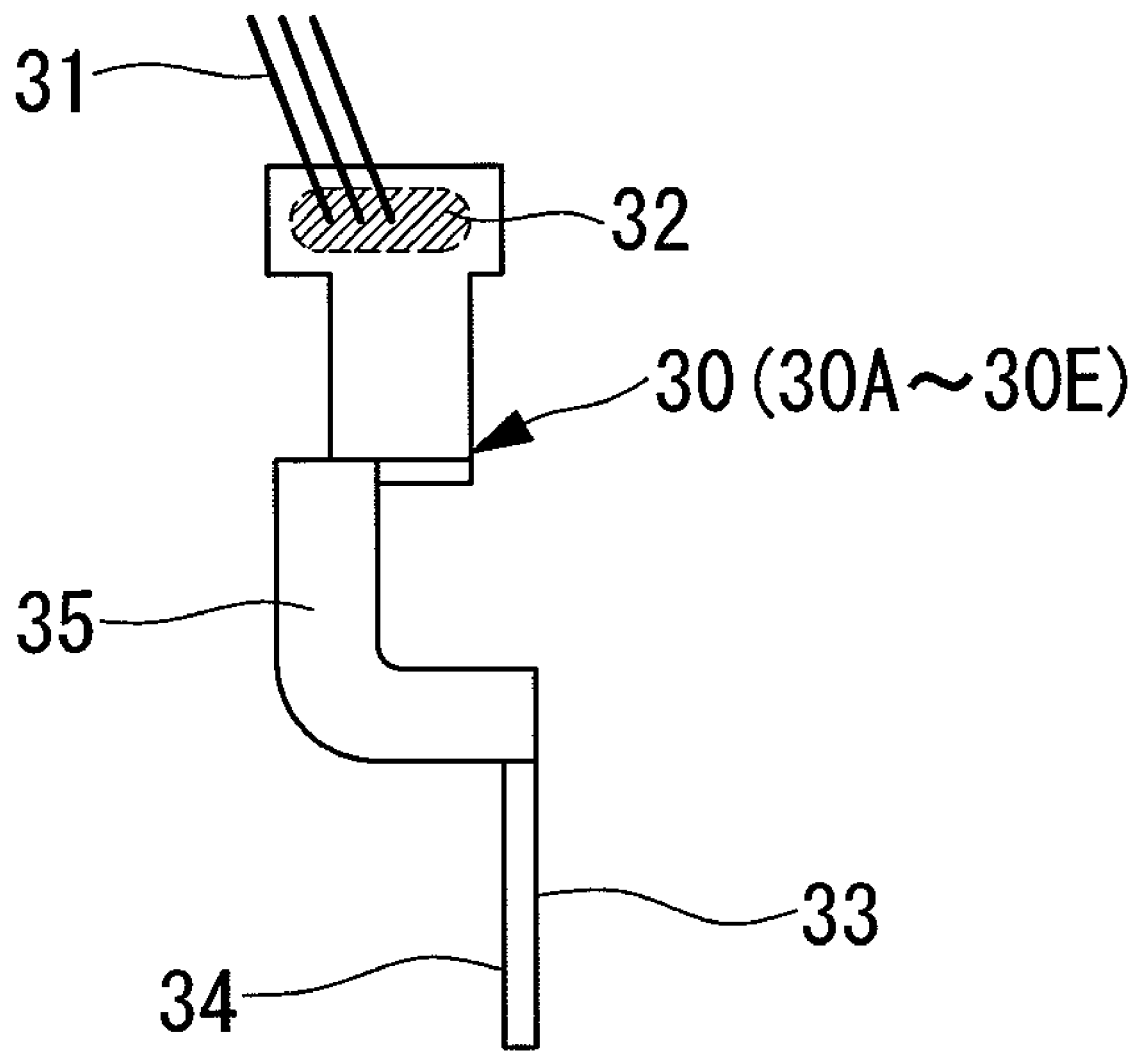
FIG. 3 is a plan view of electrical-connection metallic terminals provided in the inverter shown in FIGS. 2A to 2D.

An embodiment of the present invention will be described below with reference to FIGS. 1 to 3.

FIG. 1 is an external side view of an integrated-inverter electric compressor 1 according to an embodiment of the present invention. The integrated-inverter electric compressor 1 has a compressor housing 2 constituting an outer shell thereof. The compressor housing 2 is formed by tightly fixing a motor housing 3, which accommodates an electric motor (not shown), and a compressor housing 4, which accommodates a compression mechanism (not shown), together by means of bolts 5. The motor housing 3 and the compressor housing 4 are both formed by aluminum die-casting.

The electric motor (not shown) and the compression mechanism (not shown) accommodated respectively within the motor housing 3 and the compressor housing 4 are linked to each other via a motor shaft, and the compression mechanism is driven by rotating the electric motor. An axis of the motor shaft is indicated by L. A rear end (i.e., the right side in FIG. 1) of the motor housing 3 is provided with an intake port 6, and low-pressure refrigerant gas taken into the motor housing 3 through this intake port 6 flows around the electric motor and is subsequently taken in by the compression mechanism so as to be compressed. High-temperature high-pressure refrigerant gas compressed by the compression mechanism is discharged into the compressor housing 4 and is subsequently discharged to the outside from a discharge port 7 provided at a front end (i.e., the left side in FIG. 1) of the compressor housing 4.

The compressor housing 2 is provided with mounting legs 8A, 8B, and 8C at a total of three locations, namely, two locations at a lower part of the rear end (i.e., the right side in FIG. 1) of the motor housing 3 and a lower part of the front end (i.e., the left side in FIG. 1) of the compressor housing 4 and one location at an upper part of the compressor housing 4. The integrated-inverter electric compressor 1 is installed in a vehicle by being fixed to, for example, a sidewall of a vehicle engine (not shown) by means of bolts via these mounting legs 8A, 8B, and 8C, so as to be used as a refrigerant compressor for an air conditioner.

A box-shaped inverter accommodating section 9 is integrally formed at an upper part of an outer peripheral surface of the motor housing 3. The inverter accommodating section 9 has a box structure having an open upper surface and surrounded by peripheral walls of a predetermined height. A side surface of the box structure is provided with two power-cable outlets 10. The upper surface of the inverter accommodating section 9 is closed by fixing a cover member 11 thereon with screws. A three-phase inverter 20, which converts direct-current power from a battery to three-phase alternating-current power and supplies the three-phase alternating-current power to the electric motor, is accommodated in the inverter accommodating section 9 by joining the bottom surface of the three-phase inverter 20 in contact with a housing wall surface of the motor housing 3 acting as the bottom surface of the inverter accommodating section 9.

As shown in FIGS. 2A to 2D, the inverter 20 has a box-shaped plastic casing 21 accommodated in the inverter accommodating section 9, and a known power-system inverter circuit and a control circuit thereof that constitute the inverter 20 are provided in the casing 21. Power-system devices such as power switching devices and a power-system circuit that operates them are collectively shown as power-system components 22. The components constituting the power-system parts are collected into a package and are disposed in a lower section inside the plastic casing 21 so as to form a modular structure. A control substrate 23 having mounted thereon a circuit formed of devices that operate at low voltage, such as a CPU, is disposed above the power-system components 22 by being fixed to the plastic casing 21 with screws, etc. at four corners thereof.

A metallic plate 24 composed of an aluminum alloy and functioning as a heat sink that cools the power-system components 22, which are heated components, is attached to the bottom surface (i.e., undersurface) of the casing 21. The metallic plate 24 is joined in contact with the housing wall surface of the motor housing 3 and is cooled by low-temperature low-pressure refrigerant gas flowing through the motor housing 3. Electrical connection terminals 30 for electrically connecting the inverter 20 to the aforementioned electric motor (not shown) and to an external power source (i.e., battery) are integrally provided in the plastic casing 21 by plastic insert molding.

The electrical connection terminals 30 include two positive and negative power-supply terminals 30A and 30B, for the power source, provided at a lower section on one side surface of the casing 21 and three U-V-W three-phase alternating-current terminals 30C, 30D, and 30E, for the electric motor, provided at an upper section on another side surface of the casing 21. As shown in FIG. 3, the power-supply terminals 30A and 30B and the alternating-current terminals 30C, 30D, and 30E each have a one-piece structure formed by bending a plate having a predetermined thickness, and are substantially identical to each other. One end of each of the terminals 30A to 30E is provided with a wire-bonding weld surface 32 to which a predetermined power-system component 22 of the inverter 20 is welded via a bonding wire 31, whereas two sides at the other end are respectively provided with weld surfaces 33 and 34 to which lead wires, bus bars, or terminals (not shown) to be connected to the electric motor and the external power source are welded.

Furthermore, in each of the power-supply terminals 30A and 30B and the alternating-current terminals 30C, 30D, and 30E, a terminal body 35 is composed of brass, and substantially the entirety of the terminal body 35, including the wire-bonding weld surface 32 and the weld surface 33 but excluding the weld surface 34, is provided with a tin plating layer, whereas the weld surface 34 is provided with a nickel plating layer. The bonding wire 31 that connects each electrical connection terminal 30 to the inverter 20 is welded to the tin-plated wire-bonding weld surface 32 by, for example, ultrasonic welding. On the other hand, the lead wires, bus bars, or terminals (not shown) that connect each electrical-connection terminal 30 to the electric motor and the external power source are welded to the tin-plated weld surface 33 or the nickel-plated weld surface 34 by, for example, resistance welding.

The above-described embodiment provides the following advantages.

One end of each of the power-supply terminals 30A and 30B and the alternating-current terminals 30C, 30D, and 30E that constitute the electrical connection terminals 30 provided in the plastic casing 21 of the inverter 20 by insert molding is welded to the corresponding power-system component 22 of the inverter 20 via the bonding wire 31, which is relatively narrow, whereas the other end is welded to the electric motor and the power source via the lead wires, bus bars, or terminals (not shown), which are relatively thick; hence, the former and the latter are welded by different welding methods, namely, for example, by ultrasonic welding and by resistance welding, respectively. Therefore, the welding conditions vary depending on the respective welding methods, which can cause a mismatch to occur in the combination of weld plating layers provided on the wire-bonding weld surface 32 and the weld surfaces 33 and 34 of each electrical connection terminal 30.

In this embodiment, the weld surfaces 33 and 34, for the electric motor and the external power source, at the other end of each electrical connection terminal 30 are provided with different weld plating layers, i.e., a tin plating layer and a nickel plating layer, suitable for welding the lead wires, bus bars, or terminals thereto. Therefore, even when there is a need to change the combination of weld plating layers due to the electrical connection terminal 30's relationship with objects to be welded thereto, in terms of welding conditions, it is easy to allow for a change of the combination of weld plating layers by using one of the different weld plating layers provided on the two weld surfaces 33 and 34. Consequently, the adaptability to a change in the welding conditions is improved, thereby preventing the occurrence of weld failure or weld spatter caused by a poor combination of weld plating layers.

In each electrical connection terminal 30, the weld plating layers provided on the wire-bonding weld surface 32 at one end and one weld surface 33 at the other end are the same, that is, they are both tin plated, and the terminal body 35 is plated substantially over its entirety. Therefore, for example, after immersing the terminal body 35 in a plating solution, the other weld surface 34 at the other end is nickel-plated, whereby the electrical connection terminal 30 provided with a tin plating layer on the wire-bonding weld surface 32 at one end and provided with different plating layers, i.e., a tin plating layer and a nickel plating layer, on the weld surfaces 33 and 34 at the other end can be fabricated readily using a minimum number of steps.

Furthermore, each electrical connection terminal 30 includes a combination of materials that are both highly electrically and thermally conductive, namely, brass used for the terminal body 35, the tin plating layer for the weld plating layer on the wire-bonding weld surface 32, and the tin plating layer and the nickel plating layer for the weld plating layers on the weld surfaces 33 and 34, whereby satisfactory welding properties can be ensured. In addition, since the aforementioned materials are all readily-available materials, the electrical connection terminals 30 can be fabricated at low cost. Furthermore, since the electrical connection terminals 30 are integrally provided in the modularized plastic casing 21 of the inverter 20 by plastic insert molding, the electrical connection terminals 30 can be securely fixed in place. Consequently, when welding the bonding wire 31 and the lead wires, bus bars, or terminals to the opposite ends of each electrical connection terminal 30, these components can be properly positioned so that they can be welded with high accuracy.

The present invention is not limited to the above embodiment, and modifications are permissible so long as they do not depart from the scope of the invention. For example, although the above embodiment is directed to an example in which the present invention is applied to both types of terminals, i.e., the power-supply terminals 30A and 30B and the alternating-current terminals 30C, 30D, and 30E constituting the electrical connection terminals 30, the present invention also includes an example in which the invention is applied to only one type of terminal.

Furthermore, although the above description is directed to an example in which the terminal body 35 of each electrical connection terminal 30 is composed of brass, the plating layer on the wire-bonding weld surface 32 is a tin plating layer, and the plating layers on the weld surfaces 33 and 34 are a tin plating layer and a nickel plating layer, respectively, the invention is not limited to this, and the terminal body 35 may be composed of pure copper or a copper alloy in place of brass or may be composed of stainless steel, iron, or an iron alloy. In the case where the terminal body 35 is composed of stainless steel, iron, or an iron alloy, the weld plating layers on the wire-bonding weld surface 32 and the weld surfaces 33 and 34 may be composed of copper, gold, or silver.

Furthermore, although the above description is directed to an example in which the inverter accommodating section 9 is integrally formed in the motor housing 3, the inverter accommodating section 9 may alternatively be integrally formed in the compressor housing 4, or a separately-made inverter accommodating section may be fitted to the compressor housing 2 to construct a single unit. Moreover, in order to improve the vibration resistance of the inverter 20, the casing 21 may be filled with gelatinous resin.

The invention claimed is:

1. An integrated-inverter electric compressor in which an inverter is integrally fitted to a compressor housing containing a compression mechanism and an electric motor, and the inverter is provided with an electrical connection terminal that electrically connects the inverter to the electric motor or an external power source,
    wherein one end of the electrical connection terminal has a wire-bonding weld surface for the inverter, the wire-bonding weld surface being provided with a weld plating layer for welding a bonding wire thereto, whereas the other end of the electrical connection terminal has two sides, each of the two sides being provided with a respective weld surface for the electric motor or the external power source, the respective weld surfaces of the two sides being provided with different weld plating layers for connecting lead wires, bus bars, or terminals thereto.

2. The integrated-inverter electric compressor according to claim 1, wherein the weld plating layer provided on the wire-bonding weld surface and the weld plating layer provided on one of the two respective weld surfaces are the same weld plating layer, the weld plating layer being provided over substantially the entire electrical connection terminal.

3. The integrated-inverter electric compressor according to claim 1, wherein, in the electrical connection terminal, a terminal body is composed of brass, the weld plating layer provided on the wire-bonding weld surface is a tin plating layer, the weld plating layer provided on one of the two respective weld surfaces is a tin plating layer, and the weld plating layer provided on the other one of the two weld surfaces is a nickel plating layer.

4. The integrated-inverter electric compressor according to claim 1, wherein the electrical connection terminal is integrated, by plastic insert molding, in a plastic casing, which is modularized, of the inverter.

5. An integrated-inverter electric compressor in which an inverter is integrally fitted to a compressor housing containing a compression mechanism and an electric motor, and the inverter is provided with an electrical connection terminal that electrically connects the inverter to the electric motor and an external power source,
    wherein one end of the electrical connection terminal has a wire-bonding weld surface for the inverter, the wire-bonding weld surface being provided with a weld plating layer for welding a bonding wire thereto, whereas the other end of the electrical connection terminal has two sides, each of the two sides being provided with a respective weld surface for the electric motor and the external power source, the respective weld surfaces of the two sides being provided with different weld plating layers for connecting lead wires, bus bars, or terminals thereto.

* * * * *